Figure 1:
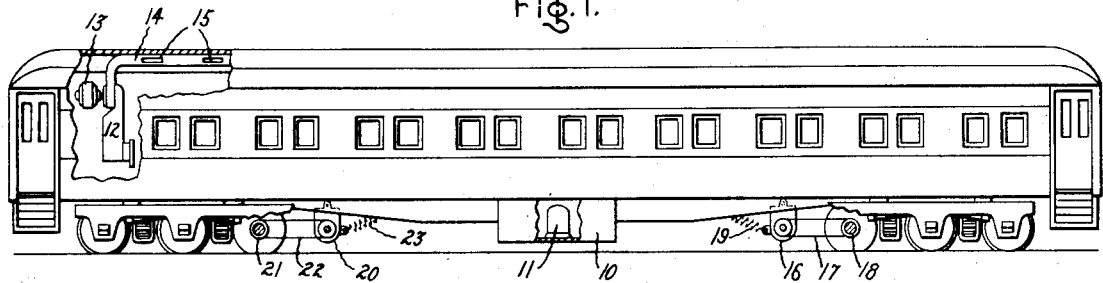

May 9, 1939.  C. G. SUITS  2,157,926

POWER SYSTEM AND CONTROL THEREFOR

Filed Dec. 29, 1937

Inventor:
Chauncey G. Suits,
by Harry E. Dunham
His Attorney.

Patented May 9, 1939

2,157,926

UNITED STATES PATENT OFFICE 2,157,926

POWER SYSTEM AND CONTROL THEREFOR

Chauncey G. Suits, Schenectady, N. Y., assignor to General Electric Company, a corporation of New York Application December 29, 1937, Serial No. 182,268

21 Claims. (Cl. 171—119)

My invention relates to alternating-current power systems, and particularly to circuit controlling devices for such systems.

Circuit controlling relays and similar control devices are commonly made to respond to variations of an electrical characteristic of the circuit which they control. In some cases it is desirable to recalibrate or change the setting of the relay when it has been operated in order that a return to its original position, or a second operation of the relay, shall occur at a different value of the controlled electrical characteristic than that required for its initial operation. One application for a relay of this type is found in the control of the frequency of the current produced by an alternating-current generator driven by a prime mover the speed of which may vary over a wide range. For example, if an alternating-current generator is driven from the axle of a railway car in order to supply power to the motors of equipment on the car the frequency of the current produced by the generator will vary directly with the speed of the car. Such wide variation of frequency is not suitable for proper operation of the motors. To avoid this wide range of frequency the generator may be provided with an arrangement to reduce the effective number of its field poles, at say, one half full speed of the car, thereby reducing the frequency of the generated current. Such change of the number of field poles may be effected by operation of a device which is responsive to the speed of the car and which will change the number of poles of the generator whenever the car speed increases or decreases from a predetermined speed. However, it is sometimes desirable to employ a relay or other device which is operated in response to the frequency of the generated current to effect the change in the number of generator poles. Such frequency responsive device must be recalibrated after operation since, otherwise, the change of frequency due to the effected change in the number of generator poles necessarily would operate the frequency responsive device in the reverse direction to reconnect the generator with its original number of poles thereby causing a "pumping" action of the device. Accordingly, it is an object of my invention to provide an improved circuit controlling device which is adapted to respond to an electrical characteristic of a controlled circuit and which provides an arrangement actuated by operation of the device to select a different value of the electrical characteristic to which it responds.

Another object of my invention is to provide a power system including an alternating-current generator driven by a variable speed prime mover and an improved device responsive to the frequency of the generator for changing the range of frequency of the generator.

Further objects and advantages of my invention will become apparent as the following description proceeds, and the features of novelty which characterize my invention will be pointed out with particularity in the claims annexed to and forming a part of this specification.

Figure 2:
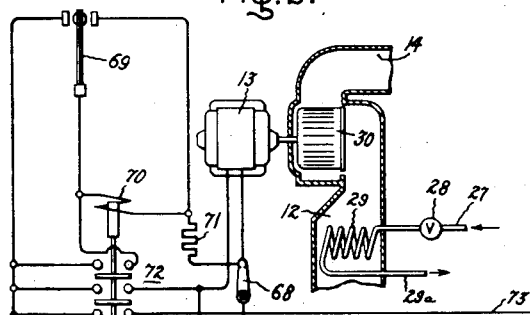
Figure 3:
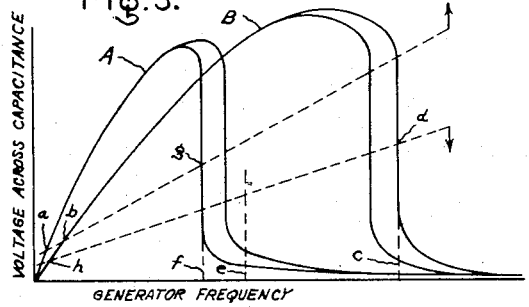
Figure 4:
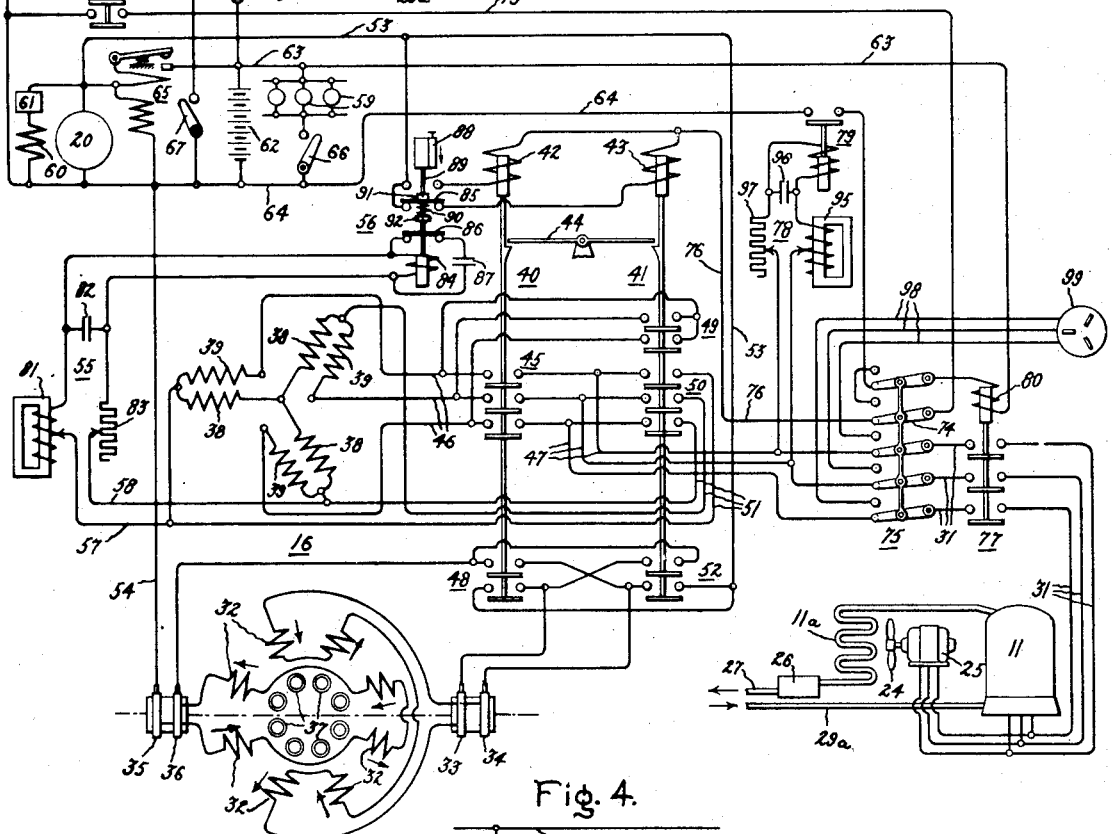

For a better understanding of my invention, reference may be had to the accompanying drawing in which Fig. 1 shows a passenger railway car provided with an electrically driven air conditioning system and an alternating power system including a control circuit embodying my invention for supplying energy to the air conditioning apparatus; Fig. 2 is a wiring diagram of the system utilized on the car shown in Fig. 1; Fig. 3 is a graph showing the characteristics of the frequency responsive relays utilized in the power system shown in Fig. 2; and Fig. 4 is a diagrammatic illustration of a phase rotation responsive device for maintaining the same direction of phase rotation of the current in the power supply lines regardless of the direction of movement of the railway car.

Referring now to the drawing, I have shown a railway car provided with a refrigerant condensing unit 10 including a hermetically sealed casing 11 in which is arranged a refrigerant compressor driven by an alternating-current motor. The condensing unit 10 is arranged to supply liquid refrigerant to the cooling coils of an air conditioning system arranged within a cooling chamber 12. The air conditioning system includes a motor 13 for driving a fan to distribute air cooled in the chamber 12 through a conduit 14 and into the upper portion of the passenger space of the car through a plurality of openings 15. In order to supply alternating-current for energizing the compressor motor and other power consuming devices, I provide an alternating-current generator 16 driven by a belt 17 from one of the car axles 18, or other suitable variable speed device, a spring 19 being provided to maintain tension in the belt 17. In order to provide field excitation current for the alternating-current generator 16 and also for energizing the lighting system and such auxiliary apparatus as the motor 13, I provide a direct-current generator 20 of the type which is usually employed in railway cars. The generator 20 is connected to be driven from an axle 21 by a belt 22, a spring 23 being provided to maintain the belt tension. The alternating-current generator 13 is arranged so that it may operate with a plurality of numbers of pairs of field poles, so that the frequency of the current produced by the generator may be varied by changing the number of poles. A dynamo-electric machine of this type is described and claimed in U. S. Letters Patent No. 1,491,451, April 22, 1924, Robert W. Wieseman, which is assigned to the General Electric Company, assignee of this invention. A frequency responsive device is provided for changing the number of poles of the generator in accordance with the speed of the car and in response to the frequency of the current produced by the generator so that the frequency of the generated current varies within a narrower range than the range of speed of the car.

The arrangement and mode of operation of the above power system will readily be understood on reference to Fig. 2, in which I have shown the hermetically sealed motor compressor unit 11 arranged to supply compressed refrigerant to a condenser 11a which is cooled by a fan 24 driven by an alternating-current motor 25. The compressed refrigerant is cooled and liquefied in the condenser and flows into a liquid receiver 26. From the receiver 26, the liquid flows through a liquid line 27 and an expansion valve 28 to the cooling coil or evaporator 29 within the cooling chamber 12. Air is circulated through the chamber 12 and into the duct 14 by operation of a fan 30 driven by the motor 13. The liquid refrigerant within the coil 29 is vaporized and returns to the casing 11 through a suction line 29a. Three-phase alternating current for operation of the motor within the casing 11 and for the motor 25 is supplied through lines 31, which are arranged to be connected to the three-phase alternating-current generator 16. The generator 16 comprises a salient pole rotor having a plurality of field exciting windings 32. The windings 32 are connected so that opposite pairs are in series, the pairs on the vertical axis being shown connected to slip rings 33 and 34 at the right, and the pairs on the horizontal axis to slip rings 35 and 36 at the left. The field exciting winding has been illustrated with eight coils 32 providing a maximum number of eight poles. When the generator is operating with its maximum number of poles, the magnetic flux in adjacent poles is in the opposite direction as indicated by the arrows. When it is desired to operate the generator with one-half its full number of poles, the current in the group of coils connected to the right-hand rings 33 and 34 is reversed, it being evident that then the polarity of each of the coils of the reversed group is the same as that of the adjacent coil of the other group. This connection provides four groups of coils, each group comprising two coils in which the direction of flux is the same and there are, therefore, four effective poles. Each of the salient poles is provided with a short circuiting ring or jacket 37 to damp the flux changes produced by the reversal of the fields when changing the number of poles of the generator. The stator of the alternating current generator 16 is provided with a plurality of field exciting windings 38 and 39 arranged to provide either a single-Y connection for the lower range of speeds or a double-Y connection for the upper range of speeds. This compensates for the change in voltage due to the change in the speeds. In order to change the number of pairs of poles on the rotor of the generator 16, and in order to change the windings of the stator from single-Y to double-Y, I provide solenoid operated switches 40 and 41 having operating solenoids 42 and 43 respectively.

In the railway air conditioning system illustrated, the switches 40 and 41, in addition to effecting a change of the number of poles of the generator, connect the alternating current supply to the motor 25 and to the motor within the casing 11. The actuation of the switches 40 and 41 is controlled by a thermostat 69 responsive to the temperature of the air within the passenger space of the car and both switches are maintained open until there is a demand for cooling of the air. The switch 40 connects the generator to be operated with its full number of poles, and with the stator windings connected in single-Y. This is the connection for the lower range of train speeds. The switch 41 connects the generator to operate with one-half the full number of poles, and with the stator windings connected in double-Y. This is the connection for the upper range of train speeds. A mechanical interlock bar 44 is provided to prevent concurrent actuation of the two switches. The switch 40 is provided with an upper group of contacts 45 for connecting the generator leads 46 to supply lines 47, and a lower group of contacts 48 for connecting the field to operate with its full number of poles. The switch 41 is provided with an upper group of contacts 49 for connecting the generator windings in double-Y, a middle group of contacts 50 for connecting generator leads 51 to the supply lines 47, and a lower group of contacts 52 for reversing the field coils connected to rings 33 and 34, to connect the generator field to operate with one-half its full number of poles. Actuation of either of the groups of field contacts 48 and 52 connects the field directly across the generator 20 through lines 53 and 54.

In order to actuate the switch 40 during the lower range of train speeds and the switch 41 during the upper range of train speeds, I provide a frequency relay 55 including an electro-responsive switch or contactor 56 and connected to be energized by the alternating current generator 16 through lines 57 and 58 which are connected across one phase of the generator. The construction and operation of the frequency responsive relay 55 is explained more fully hereinafter. In its upper position, the switch 56 connects the solenoid 42, so that the switch 40 will be actuated upon operation of the thermostat; and in its lower position, the switch 56 connects the solenoid 43, so that the switch 41 will be actuated upon operation of the thermostat.

Direct current is supplied by the generator 20 for energizing the control circuits and the field excitation of the alternator 16 and any auxiliary apparatus, such as the motor 13 and a plurality of lights 59. The generator 20 is of the type commonly employed on railway cars and is provided with a field 60 and with a field regulator 61. A storage battery 62 is provided to supply direct current when the train is not in motion; the battery is permanently connected to supply lines 63 and 64. A cutout 65 is provided to connect the battery to the generator for charging whenever the voltage of the generator is greater than that of the battery, this arrangement being usually employed for railway car lighting circuits. The lights 59 may be connected across the lines 63 and 64 by a switch 66, and the motor 13 may be connected across the lines 63 and 64 by a switch 67 in the event it is desired to run the motor 13 continuously. A switch 8 is provided in the circuit of the motor 13, so that the circuit may be opened to prevent the automatic starting of the motor and consequent draining of the battery when the car is out of service.

The thermostat for controlling the air conditioning system is indicated at 69. When the thermostat calls for cooling, it moves to the left and connects a coil 70 across the battery in series with a resistor 71 to actuate a switch 72. The upper contact of the switch closes a holding circuit for the coil 70. The middle contact connects the motor 13 across the battery, and the lower contact connects the generator 20 to a supply line 73, which leads to an arm 74 of a manual switch 75. This connection completes a circuit to one side of the solenoids 42 and 43 through a line 76. One of the coils 42 and 43 is energized by being connected between lines 76 and 53, the coil selected depending upon the position of the switch 56, and the corresponding one of the switches 40 and 41 is thereby actuated, the field exciting winding of the generator energized, and the generator connected to the supply lines 47. The supply lines 47 are connected to the alternating current motor lines 31 through the three lower arms of the switch 75 and, therefore, supply power for operating the alternating current motors of the air conditioning system.

The speed of the alternating current motors depends upon the frequency of the current supplied by the generator 16 and, although the pole changing arrangement described above insures operation of the generator to produce current within a range of frequencies less than the range of speeds of the train, nevertheless, excessively high speeds of the train might result in too high a frequency for proper operation of the motors. It is desirable to provide some arrangement for preventing overspeed of the motors in the event the train is operated at speeds substantially in excess of normal full speed. A switch or contactor 77 is, therefore, provided in the lines 31 and is arranged to be actuated by a frequency responsive relay 78 having a switch or contactor 79 in the circuit of an operating solenoid 80 of the switch 77, the solenoid 80 being arranged to be connected across the lines 63 and 64. The relay 78 is similar to the relay 55, and is connected across the lines 47, so that it is responsive to the frequency of the current supplied by the alternating-current generator 16. The relay 78 is designed to maintain the switch 79 closed as long as the generator 16 is supplying a current within a normal range of frequency and to open when the frequency is increased above a predetermined maximum value.

The energization of the alternating-current motors by current at very low frequencies is also undesirable. Such operation is, however, prevented by the inherent characteristics of the system, because the generator 20 does not build up its voltage until a substantial speed of the car has been reached and it is, therefore, impossible to operate the control circuits until the speed is sufficient to produce current at a frequency affording satisfactory operation of the motor.

The operation of the compressor motor and the motor 25 in response to a call for cooling continues until the thermostat 69 is satisfied at which time the thermostat moves to the right and short circuits the coil 70 thereby causing the switch 72 to drop out and deenergize the circuit of the switches 40 and 41 and disconnecting the generator 16 from the motor supply circuit 31.

It is apparent that the alternating-current motors of the air conditioning system will be actuated at frequencies within a predetermined range, the upper limit of which is determined by the relay 78, and the lower limit by the speed at which the generator 20 builds up its voltage. Furthermore, the frequency of the current supplied to the alternating-current motors will vary within a range less than the range of speeds of the car because of the operation of the switches 40 and 41, as determined by the frequency responsive relay 55. The general arrangement of the air conditioning system just described is similar, except for the construction and mode of operation of the frequency selecting relay, to that described and claimed in a copending application, Serial No. 182,266, filed December 29, 1937, in the names of Max A. Whiting and David W. McLenegan, and assigned to the same assignee as my present application. I do not, therefore, claim herein anything described or claimed in the said Whiting and McLenegan application.

The frequency responsive relay 55 may be any suitable device designed to operate at a predetermined value of frequency of the voltage produced by the generator to effect a change of the number of poles of the generator. In the above-mentioned Whiting and McLenegan application, a relay is employed which operates in response to train speed and which utilizes a pilot generator driven by the car axle. Such relay connects the generator with its full number of poles for speeds below a predetermined value and with one-half its full number of poles for speeds above the predetermined value. I prefer to utilize a relay or other device which is responsive to the frequency of the voltage produced by the pole changing generator, and thereby avoid the necessity of providing some device such as a pilot generator driven by the car axle. It will be apparent, however, that if this train speed responsive relay is connected to be energized in response to the frequency of the pole changing generator, the change of frequency produced by the change of poles would cause the relay to return to its position before the change and, consequently, the relay would be ineffective to control the number of poles of the generator in accordance with the speed of the train. In order to avoid this difficulty, some arrangement must be provided to re-calibrate or adjust the pole changing device, so that it will not return to its original position when the frequency is changed by the pole changing operation. In order to provide a frequency responsive device which may be re-calibrated in this manner, I prefer to use a frequency responsive relay including a non-linear resonant circuit of the type disclosed in my U. S. Letters Patent No. 2,021,753, granted November 19, 1935, and assigned to the General Electric Company, assignee of this invention, and having an arrangement for changing the characteristics of the circuit to effect a re-calibration. The relay 55, which is of this type, comprises a saturable inductance element 81, a capacitance element 82 and a resistance element 83. The inductance and resistance 81 and 83 respectively, are made adjustable in order that the critical frequencies which govern the operation of the relay may be varied. The inductance, capacitance and resistance elements are connected in series as an electric network across one phase of the generator 16 through lines 57 and 58. The switch 56 is provided with a solenoid or electro-responsive device 84 connected across the capacitor 82, to operate in accordance with the voltage across the capacitor. The switch 56 is provided with an arm 85 which in its drop-out position, as shown, connects the coil 43 of the switch 41 to be energized, and in its pick-up position connects the coil 42 of the switch 40 to be energized. A lower switch arm 86 is provided to connect a second capacitance element 87 in parallel with the capacitance element 82 when the switch is in its drop-out position. Since the inductance element 81 is saturable, the value thereof varies with current and, by proper proportioning the inductance, capacitance and resistance elements of the non-linear resonant circuit may be designed to have volt-ampere characteristics so correlated as to obtain characteristic curves similar to those shown in Fig. 3. These curves are plotted with voltage across the capacitance as the ordinate, and applied frequency, that is frequency of the generator 16, as the abscissa. The pick-up and drop-out curves of the solenoid 84 are indicated by dotted lines. Curve A is a characteristic curve of the relay when the capacitance elements 82 and 87 are connected in parallel, and curve B is the characteristic curve of the relay when the capacitance element 87 is disconnected. In both curves, an increase of frequency from zero produces a steady increase of voltage across the capacitance element until a condition of nonlinear resonance is reached at which there is a sudden decrease in voltage for a very slight increase in frequency. This is the critical frequency of the relay on increasing frequency. A continuing increase in frequency results in a very slight change in voltage across the capacitance. When the frequency is decreased, a critical value is reached at a frequency slightly less than the critical value on increased frequency and there is a sudden rise in voltage across the capacitance the remaining portions of the curves for rising and falling frequency substantially coinciding. The frequency produced by the generator 16 at the minimum speed at which the D. C. generator 20 builds up its voltage is about 12 to 20 miles an hour, and the frequency of the generator 16 then is sufficiently high to produce a voltage across the two capacitors which will pick up the switch 56; the relay will pick up at any value of voltage above the point $a$ on the curve A. As soon as the relay of switch 56 is picked up, the switch 40 is operated to connect the generator 16 with its maximum number of poles. The frequency is, therefore, increased and although the picking up of the relay disconnects the capacitance 87 and transfer the relay to the characteristic curve B, the new frequency will nevertheless be above the pick-up value at the point $b$ on the curve B. As the speed of the train increases, the frequency will increase until it reaches a value $c$ which is the critical value of frequency for the curve B on rising frequency, and the voltage across the capacitor will fall below the drop-out value at $d$. This causes the switch 56 to drop out thereby deenergizing the coil 42 and disconnecting the switch 40 and energizing the coil 43 to operate the switch 41 and connect the generator with its minimum number of poles. The capacitance 87 is also reconnected in the non-linear resonant circuit, so that the characteristic of the relay changes from the curve B to the curve A. The reduction in the number of poles in the generator 16 reduces the frequency of the voltage produced by the generator to some value; say, $e$, which is above the critical frequency of the curve A and on the drop-out position of the curve. The switch 56 will, therefore, remain in its drop-out position even though the frequency has been materially reduced. As the train speed continues to increase, the voltage across the two capacitors in parallel will continue to decrease gradually along the curve A. When the train speed is decreased, the frequency of the voltage produced by the generator 16 will fall until it reaches a value $f$ which is the critical value on decreasing frequency when both capacitors are connected in the non-linear resonant circuit. The voltage across the capacitors suddenly rises to a value above the pick-up value at $g$ and the relay switch 56 is picked up thereby disconnecting the capacitance 87 and increasing the number of poles of the generator by disconnecting the coil 43 and energizing the coil 42. The operation of the non-linear circuit then follows the characteristic curve B and decreases along the curve B as the train speed is further decreased and finally drops out at the drop-out point $h$. The decrease in the number of poles of the generator on drop-out of the relay decreases the frequency to a value below the drop-out value for the curve A and the relay switch 56 remains in its drop-out position.

A further consideration of the operation of the frequency responsive relay will make it apparent that some arrangement must be provided to prevent the dropping out of the relay immediately after it has been picked up due to the operation of changing the generator field by transferring the control from the switch 41 to the switch 40. During the field changing operation, there is an interval when the generator field is opened and the generator voltage falls. The fall in generator voltage, therefore, causes a reduction of the voltage across the capacitance elements and the relay switch 56 will drop out to reconnect the generator with its maximum number of poles. This operation would be repeated every time the relay picked up, and it would be impossible to maintain the switch in its pick-up position. I, therefore, provide a time delay device such as a dashpot 88 which is associated with the switch rod indicated at 89 to retard the dropping out of the switch. I also mount the switch arm 85, so that it may be moved longitudinally of the switch axis, and provide a spring 90 for holding the arm 85 against a stop 91 secured to the switch rod, the other end of the spring being secured to a collar 92 rigidly connected to the rod. When the switch 56 is in its drop-out position, the arm 85 engages the middle set of contacts to energize the coil 43 and the stop 91 rests on the arm. When the switch moves to its pick-up position, the arm 85 engages the upper contacts and the rod 89 continues to move a short distance, the arm being held against the contacts by the spring 90. It is, therefore, apparent that since the stop 91 must move a short distance in dropping out before it engages the arm 85 to move it away from the upper contacts, it is possible to delay the opening of the coil 42 by means of the dashpot 88, which causes the arm 89 to move downwardly at a retarded rate. This delay of the time for the opening of the upper set of contacts after the solenoid 84 has been deenergized, maintains the coil 42 energized a sufficient time to insure re-connection of the generator 16 and the establishment of voltage across the lines 57 and 58 thereby energizing solenoid 84 and again picking up the rod 89 and holding it in its pick-up position.

The relay 55, therefore, is re-calibrated at each operation of the switch 56 by changing the effective value of the capacitance element and, furthermore, stable operation is insured by providing the time delay device 88. In designing the non-linear resonant relay 55, the critical frequencies c and f are selected to effect operation of the pole changing mechanism at approximately one-half the maximum speed of the train so that the generator 16 will operate with its full number of poles until the train reaches one-half its full maximum speed when the generator will be shifted to one-half its full number of poles for higher speeds, and so that the changing of frequency on decrease of speed also may be accomplished effectively in a like manner.

The relay 78 which opens the switch 79 when the frequency of the generator voltage rises to a predetermined maximum permissible value is similar to the relay 55 except that it is not necessary to change the calibration of the relay 78 upon operation thereof. The relay 78 comprises a saturable inductance 95, a capacitance 96, and a resistance 97 connected in series across two of the lines 47 so that it is responsive to the alternating-current voltage supplied to the motors. The characteristic of the relay 78 is similar to the characteristic of the relay 55 so that the switch 79 is picked up at a predetermined minimum value of frequency and is maintained picked up until a critical value of frequency is reached. This critical value is the maximum permissible frequency. The switch 79 drops out at the critical value and opens the circuit of the solenoid 80 thereby deenergizing the motors.

Manual switch 75 is provided in order that the alternating-current motors may be supplied from a suitable alternating-current source available in the station when the train is at a standstill. In order to connect the air conditioning system for operation from the station supply, the switch 75 is moved to its upper position. The lower three arms then connect lines 31 to supply lines 98 which are connected to a receptacle 99 for receiving the station supply. The arm 74 and the top arm of the switch 75 connect the coil 80 between the lines 63 and 73. This places the coil 80 under control of the thermostat 69, it being evident that when the thermostat calls for cooling and operates the switch 74, the coil 80 will be connected across the battery 62 through the lines 63 and 73. Therefore, when the train is in the station, the air conditioning system may be operated from the station supply under control of the thermostat 69.

It is desirable to prevent a reversal of the phase rotation of the voltage supplied to the motors in order to prevent a reversal of the motors, and in Fig. 4 I have shown a phase rotation responsive device which may be connected in the lines 31 to reverse two of the lines whenever the phase rotation of the supply is in a direction opposite that desired thereby connecting the motors with the desired direction of phase rotation. The device shown in Fig. 4 comprises a polyphase induction motor 100 connected across the lines 31 and a reversing switch 101 arranged to be operated by the motor. This device is preferably connected in the lines 31 between the switches 75 and 77. The winding in the motor 100 is energized by the voltage at the three lower blades of the switch 75. When the phase rotation is in one direction, the motor tends to rotate in a clockwise direction and move the switch 101 to its upper position by means of a train of gears 102 and a rack 103. When the phase rotation is in the other direction, the motor turns in a counter-clockwise direction and moves the switch to the position shown. The characteristics of the motor 100 are such that it may be stalled without harm when the switch 101 reaches either of its two extreme portions.

During the operation of the power system described above when the car leaves the station, manual switch 75 is closed in its lower position thereby disconnecting the station supply and connecting the supply lines 47 to the motor lines 31. As soon as the car attains sufficient speed, the direct-current generator 20 will build up its voltage to a sufficient value to close the cutout 65 and connect the generator to charge the battery 61. Should the thermostat 69 call for cooling, the switch 72 will be closed to energize the solenoid 43 through the arm 85 of the switch 56 in its dropout position. This excites the field of the generator 16 through the field switch contacts 52 and connects the field with its minimum number of poles. The frequency produced will be sufficient at a train speed of from 12 to 20 miles an hour to produce a voltage across the capacitors of the relay 55 sufficient to pick up the relay which will then connect the solenoid 42 and pick up the switch 40 to connect the generator in single-Y and with its maximum number of poles and also to connect the generator supply lines 46 to the motor supply lines 47. Energy is, therefore, available for the motors and if the frequency of the current is sufficiently high, the relay 78 will pick up the switch 79 thereby closing the switch 77 and energizing the motors to operate the refrigerating system. As the speed of the car increases, the frequency of the current produced by the generator 16 will increase until it reaches the value c on the curve B. Then the switch 56 will drop out thereby deenergizing the coil 42 and energizing the coil 43. This transfers the connections of the generator 16 from the switch 40 to the switch 41 and the generator 16 is thereby connected with its reduced number of poles, the field exciting winding being connected by its switch contacts 52 so that the generator 16 operates with one-half its full number of poles. The stator is connected in double-Y through the contacts 49, and the generator leads 51 are connected to the supply lines 47 through the group of contacts 50. The frequency of the current supplied by the generator 16 to the motors is thereby reduced. The picking up of the relay switch 56, however, is prevented since the characteristic of the relay has been changed by connecting the capacitance 87 in parallel with the capacitance 82 thereby changing the characteristic from curve B to curve A. As the speed of the car increases, the frequency of the current produced by the generator 16 will remain sufficiently low for proper operation of the motors. Should the frequency of the generated voltage for any reason become excessive and reach the critical value of the relay 78, the switch 79 will drop out and deenergize the coil 80 thereby disconnecting the motors from the generator 16. Should the demand for cooling be satisfied, the thermostat 69 will move to the right; short circuit the coil 70 and open the switch 72 thereby deenergizing the circuit of the solenoids 42 and 43 and disconnecting the generator 16.

From the foregoing, it is readily apparent that I have provided an alternating-current power system including a generator driven by a variable speed prime mover and an arrangement for maintaining the range of frequency of the voltage produced by said generator more narrow than the range of speed of the prime mover, the control of the generator frequency being effected in response to the generator frequency, and, furthermore, that I have provided a simple and effective circuit control device or relay including an arrangement for re-calibrating or changing the characteristic of the relay in accordance with the requirements of the controlled circuit.

While I have described my invention as applied to an alternating-current power system for vehicles such as railway cars, other applications will readily be apparent to those skilled in the art. I do not, therefore, desire my invention to be limited to the particular construction shown and described, and I intend in the appended claims to cover all modifications within the spirit and scope of my invention.

What I claim as new and desire to secure by Letters Patent of the United States, is:

1. A circuit controlling means comprising an electric network including an inductance element variable with current and a capacitance element, said elements being so connected and having volt-ampere characteristics so correlated as to obtain a condition of nonlinear resonance at a critical value of an electrical characteristic applied to said network, electric circuit means connected to be energized from said electric network, and means operative in accordance with the degree of energization of said electric circuit means for changing the effective value of one of the elements of said electric network.

2. A circuit controlling means comprising a nonlinear resonant circuit including in series relation a saturable inductance element and a capacitance element, an electroresponsive means connected to be energized in accordance with variations in an electrical characteristic of said nonlinear circuit and operative between two circuit controlling positions, and means responsive to the operation of said electroresponsive means from one circuit controlling position to the other for changing the effective value of one of the elements of said nonlinear resonant circuit.

3. A circuit controlling means comprising a nonlinear resonant circuit including in series relation a saturable inductance element and a capacitance element, electroresponsive means connected to be energized from said capacitance element, and means operated by said electroresponsive means for changing the effective value of said capacitance element.

4. A circuit controlling means comprising a nonlinear resonant circuit including in series relation a saturable inductance element and a capacitance element, a second capacitance element, and means including a relay connected across said first mentioned capacitance element and having contacts for connecting said second capacitance element in parallel relation with said first mentioned capacitance element when said relay is energized below a predetermined value.

5. A circuit controlling means comprising an electric network including an inductance element variable with current and a capacitance element, said elements being so connected and having volt-ampere characteristics so correlated as to obtain a condition of non-linear resonance for producing an electric quantity in said network which on a change of an applied electrical characteristic varies abruptly at a critical value of said characteristic, means for changing the value of one of said elements to obtain a different condition of non-linear resonance whereby said electric quantity varies abruptly at a different critical value of said applied electrical characteristic, and means dependent upon the abrupt change of said electric quantity under either of said conditions of nonlinear resonance for changing the value of said one of said elements to obtain the other of said conditions of nonlinear resonance.

6. A circuit controlling means comprising an electric network including an inductance element variable with current and a capacitance element, said elements being so connected and having volt-ampere characteristics so correlated as to obtain a condition of nonlinear resonance for producing an electric quantity in said network which on a change of an applied electrical characteristic varies abruptly at a critical value of said characteristic, and means dependent upon said abrupt variation of said electric quantity for changing the value of one of said elements to obtain a different condition of nonlinear resonance for causing said electric quantity on an opposite change of said electrical characteristic to vary abruptly in a direction opposite that of said first abrupt variation and at a critical value of said applied electrical characteristic substantially different from said first-mentioned critical value, said second mentioned abrupt variation of said electric quantity causing said value changing means to restore said network to its original condition.

7. A circuit controlling means comprising an electric network including an inductance variable with current and a capacitance, said inductance and said capacitance being so connected and having volt-ampere characteristics so correlated as to obtain a condition of nonlinear resonance for producing a voltage across said capacitance which on a change of an applied electrical characteristic varies abruptly at a critical value of said characteristic, and means depending upon said abrupt variation of voltage across said capacitance for changing the value of said capacitance to obtain a different condition of nonlinear resonance for causing the voltage across said capacitance on an opposite change of said electrical characteristic to vary abruptly in a direction opposite that of said first abrupt variation and at a critical value of said electric characteristic substantially different from said first-mentioned critical value, said second-mentioned abrupt variation of the voltage across the capacitance causing said capacitance changing means to restore said network to its original condition.

8. A frequency-responsive means comprising an electric network including an inductance element variable with current and a capacitance element, said elements being so connected and having volt-ampere characteristics so correlated as to obtain a condition of nonlinear resonance for producing an electric quantity in said network which on increasing frequency of applied voltage varies abruptly at a critical frequency of applied voltage, and means dependent upon said abrupt variation of said electric quantity for changing the value of one of said elements to obtain a different condition of nonlinear resonance for causing said electric quantity on decreasing of the frequency of applied voltage to vary abruptly in a direction opposite that of said first abrupt variation and at a critical frequency substantially lower than said first mentioned critical frequency, said second-mentioned abrupt variation of said electric quantity causing said value changing means to restore said network to its original condition.

9. A frequency responsive means comprising an electric network including an inductance variable with current and a capacitance, said inductance and said capacitance being so connected and having volt-ampere characteristics so correlated as to obtain a condition of nonlinear resonance for producing a voltage across said capacitance which on increasing frequency of applied voltage varies abruptly at a critical frequency of applied voltage, and means dependent upon said abrupt variation of voltage across said capacitance for increasing the value of said capacitance to obtain a different condition of nonlinear resonance for causing the voltage across said capacitance on decreasing of the frequency of applied voltage to vary abruptly in a direction opposite that of said first abrupt variation and at a critical frequency substantially lower than said first-mentioned critical frequency, said second-mentioned abrupt variation of voltage across said capacitance causing said capacitance changing means to restore said network to its original condition.

10. A circuit controlling means comprising an electric network including an inductance element variable with current and a capacitance element, said elements being so connected and having volt-ampere characteristics so correlated as to obtain a condition of nonlinear resonance for producing an electric quantity in said network which on a change of an applied electrical characteristic varies abruptly at a critical value of said characteristic, means dependent upon said abrupt variation of said electric quantity for changing the value of one of said elements to obtain a different condition of nonlinear resonance for causing said electric quantity on an opposite change of said electrical characteristic to vary abruptly in a direction opposite that of said first abrupt variation and at a critical value of said electrical characteristic substantially different from said first-mentioned critical value, said second-mentioned abrupt variation of said electric quantity causing said value changing means to restore said network to its original condition, and means for maintaining said network in said original condition for a predetermined period of time after said second-mentioned abrupt variation regardless of changes of said electric characteristic.

11. A circuit controlling means comprising a non-linear resonant circuit including a saturable inductance element and a capacitance element, an electro-responsive means connected to be energized in accordance with variations in an electrical characteristic of said non-linear circuit and operative between two circuit controlling positions, means responsive to the operation of said electro-responsive device from one circuit controlling position to the other for changing the effective value of one of the elements of said non-linear resonant circuit, a circuit controlling device, means dependent upon the operation of said electro-responsive device into one of said two positions for energizing said control device, and means for preventing operation of said last-mentioned means for a predetermined interval of time after the operation of said electro-responsive device into said one of said positions.

12. A circuit controlling means comprising a non-linear resonant circuit including a saturable inductance element and a capacitance element, a circuit arranged to be controlled by said means, an electro-responsive means connected to be energized in accordance with variations in an electrical characteristic of said non-linear circuit and operative between two circuit controlling positions to vary an electrical characteristic of said controlled circuit, said non-linear circuit being arranged to be energized in accordance with said electrical characteristic of said controlled circuit, means responsive to the operation of said electro-responsive means from one circuit controlling position to the other for changing the effective value of one of the elements of said non-linear resonant circuit, and means for preventing a change of said electrical characteristic of said controlled circuit for a predetermined interval of time after operation of said value changing means.

13. A power system including a source of alternating current of variable frequency, a power consuming device, means for connecting said source and said device for supplying power from said source to said device, means responsive to a critical frequency of the current supplied by said source for changing the frequency of said current, and means dependent upon operation of said frequency responsive means for changing the value of the critical frequency at which said frequency responsive means will operate.

14. A power system including a source of alternating current of variable frequency, a power consuming device, means for connecting said source and said device for supplying power from said source to said device, means responsive to a critical frequency of the current supplied by said source for changing the frequency of said current, means dependent upon operation of said frequency responsive means for changing the value of the critical frequency at which said frequency responsive means will operate, and means for preventing a second operation of said frequency responsive means for a predetermined period of time after an initial operation thereof.

15. A power system including a source of alternating current of variable frequency, a power receiving device, means for connecting said source to said device for supplying power from said source to said device, means responsive to a critical frequency of the current supplied by said source for changing the frequency of said current, said frequency responsive means comprising a non-linear resonant circuit including in series relation a saturable inductance element and a capacitance element, an electro-responsive means connected to be energized in accordance with variations in an electrical characteristic of said non-linear circuit and operative between two circuit controlling positions, said electro-responsive means being arranged to determine the range of frequency of the current supplied by said source, and means responsive to the operation of said electro-responsive means from one circuit controlling position to the other for changing the effective value of one of the elements of said non-linear resonant circuit to prevent a second change of frequency of said source until there has been a substantial variation in frequency thereof.

16. A power system including an alternating current generator, a variable speed device arranged to drive said generator, said generator having a plurality of pairs of field poles, an alternating current motor, means for supplying to said motor current produced by said generator to energize said motor, and means responsive to the frequency of the current produced by said generator for changing the effective number of pairs of said field poles to change the range of frequency of the current produced by said generator and for maintaining the range of speeds of said motor more narrow than the range of speeds of said device, said frequency responsive means being dependent upon a critical frequency of the current produced by said generator, and means dependent upon operation of said frequency responsive means for changing the value of the critical frequency at which said frequency responsive means will operate to prevent a second operation of said frequency responsive means until there has been a substantial change of frequency of the current produced by said generator.

17. A power system including an alternating current generator, a variable speed device arranged to drive said generator, said generator having a plurality of pairs of field poles, an alternating current motor, means for supplying to said motor current produced by said generator to energize said motor, and means responsive to the frequency of the current produced by said generator for changing the effective number of pairs of said field poles to change the range of frequency of the current produced by said generator and for maintaining the range of speeds of said motor more narrow than the range of speeds of said device, said frequency responsive means being dependent upon an increase to a predetermined critical value of the frequency of the current produced by said generator for lowering the frequency of said current, and means dependent upon operation of said frequency responsive means for changing the value of the critical frequency at which said frequency responsive means will operate upon a decrease of the frequency of the current produced by said generator to a critical value substantially less than said first-mentioned critical value.

18. A power system including an alternating current generator, a variable speed device arranged to drive said generator, said generator having a plurality of pairs of field poles, an alternating current motor, means for supplying to said motor current produced by said generator to energize said motor, means responsive to an increase of frequency of the current produced by said motor to a predetermined critical value for decreasing the effective number of pairs of said field poles to reduce the frequency of the current produced by said generator, and means cooperating with said frequency responsive means to decrease the critical value of frequency at which said means will operate to prevent a decrease of the number of pairs of poles of said generator until the frequency of the current produced by said generator has been reduced to a value substantially less than said first-mentioned critical value.

19. A power system including an alternating current generator, a variable speed device arranged to drive said generator, said generator having a plurality of pairs of field poles, an alternating current motor, means for supplying to said motor current produced by said generator to energize said motor, and means responsive to the frequency of the current produced by said generator for changing the effective number of pairs of said field poles to vary the range of frequencies of the current produced by said generator in accordance with the speed of said device, said frequency responsive means comprising a non-linear resonant circuit including a saturable inductance element and a capacitance element and electro-responsive means connected to be energized from one of said elements, said pole changing means being operated by said electro-responsive means, and means operated by said electro-responsive means for changing the effective value of said one of said elements.

20. A power system including an alternating current generator, a variable speed device arranged to drive said generator, said generator having a plurality of pairs of field poles, an alternating current motor, means for supplying to said motor current produced by said generator to energize said motor, and means responsive to the frequency of the current produced by said generator for changing the effective number of pairs of said field poles to vary the frequency of the current produced by said generator and for maintaining the range of speeds of said motor more narrow than the range of speeds of said device, said frequency responsive means comprising a non-linear resonant circuit including in series relation a saturable inductance element and a capacitance element and electro-responsive means connected to be energized from said capacitance element, said pole changing means being operated by said electro-responsive means, and means operated by said electro-responsive means for changing the effective value of said capacitance element.

21. A power system including an alternating current generator, a variable speed device arranged to drive said generator, said generator having a plurality of pairs of field poles, an alternating current motor, means for supplying to said motor current produced by said generator to energize said motor, and means responsive to the frequency of the current produced by said generator for changing the effective number of pairs of said field poles to vary the frequency of the current produced by said generator and for maintaining the range of speeds of said motor more narrow than the range of speeds of said device, said frequency responsive means comprising a non-linear resonant circuit including in series relation a saturable inductance element and a capacitance element and electro-responsive means connected to be energized from said capacitance element, said pole changing means being operated by said electro-responsive means, means operated by said electro-responsive means for changing the effective value of said capacitance element, and means for maintaining said electro-responsive means in its operated position until the completion of the operation of said pole changing means.

CHAUNCEY G. SUITS.